United States Patent
Kohda et al.

(10) Patent No.: US 6,667,488 B2
(45) Date of Patent: Dec. 23, 2003

(54) RADIATION IMAGE ACQUISITION METHOD AND APPARATUS

(75) Inventors: Katsuhiro Kohda, Kaisei-machi (JP); Seiji Tazaki, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/781,414

(22) Filed: Feb. 13, 2001

(65) Prior Publication Data

US 2001/0030304 A1 Oct. 18, 2001

(30) Foreign Application Priority Data

Feb. 14, 2000 (JP) ........................................ 2000-034515

(51) Int. Cl.[7] ................................................ G01T 1/105
(52) U.S. Cl. ........................ 250/586; 250/581; 250/589
(58) Field of Search ................................ 250/581, 582, 250/583, 584, 585, 586, 589, 484.4

(56) References Cited

U.S. PATENT DOCUMENTS 5,444,266 A * 8/1995 Takeda et al. ............... 250/586
6,255,660 B1 * 7/2001 Isoda et al. ............... 250/484.4
6,333,513 B1 * 12/2001 Iwabuchi .................... 250/587

FOREIGN PATENT DOCUMENTS

JP          62-36600         2/1987    ............ G21K/4/00

OTHER PUBLICATIONS

Patent Abstract of Japan 62036600 Feb. 17, 1987.

* cited by examiner

Primary Examiner—Constantine Hannaher
Assistant Examiner—Timothy Moran
(74) Attorney, Agent, or Firm—Sughrue Mion, PLLC

(57) ABSTRACT

In a radiation image acquisition apparatus that obtains a radiation image recorded on a stimulable phosphor layer having a plurality of arranged cells, the quantity of stimulated emissions from the stimulable phosphor within each cell is obtained precisely for each cell as a digital image signal. A radiation image conversion panel comprising a phosphor layer formed of multiple cells filled with stimulable phosphor having recorded on the surface thereof a radiation image is scanned with a stimulating light beam by a scanning unit, and the stimulated emissions caused thereby are photoelectrically detected as an analog image signal by a photoelectrical amplifier. The signal component representing the partition walls is recognized, and the component of the analog image signal obtained between the recognized signal components representing the cell partition walls is digitized and a digital image signal is obtained.

41 Claims, 9 Drawing Sheets

RADIATION IMAGE ACQUISITION METHOD AND APPARATUS

BACKGROUND OF THE INVENTION

1. Field of the Invention

The present invention relates to a radiation image acquisition method and apparatus, and more particularly to a radiation image acquisition method and apparatus wherein a radiation image recorded on a radiation image conversion panel is obtained as a digital image signal, further comprising a cell interval detection method and apparatus therefor.

2. Description of the Related Art

The use of a stimulable phosphor in recording radiation images as an alternative to the method of recording radiation images employing conventional photographic film and a sensitized screen is well known. In this method, an radiation image conversion panel (also called a stimulable phosphor sheet) having on the surface thereof a stimulable phosphor layer (herein after referred to as a phosphor layer) containing stimulable phosphor, absorbs energy from radiation passing through the body of a subject or emitted by a subject to record a latent image representing a radiation image. Afterwards, the stimulable phosphor is exposed to stimulating electromagnetic energy such as visible or infrared light, causing the energy from the radiation accumulated thereon to be emitted as light. In this specification, the light emitted from the stimulable phosphor upon stimulation thereof will be referred to as "stimulated emission". This stimulated emission is then read out as photoelectrical signals and reproduced as a visible image. After the radiation image has been read out from the phosphor layer, the energy stored thereon is erased and the radiation image conversion panel is reused for recording and reproducing radiation images in the same way.

It is preferable that the radiation image conversion panel described above be highly sensitive and capable of reproducing high-image quality radiation images. In particular, the ability to reproduce high-resolution X-ray images, which are the representative diagnostic-use radiation image, is desirable.

However, the stimulating light employed for reading out the radiation image stored in the phosphor layer of the radiation image conversion panel is dispersed within the phosphor layer, causing a degradation in image resolution. That is to say, the beam of stimulating light focused on the inner surface of the phosphor layer is scanned in the main and a sub-scanning directions, and the stimulated emission caused thereby to be emitted from the phosphor sheet is sequentially focused and read out; however, if the stimulating light irradiating the phosphor layer is dispersed horizontally therein, the stimulable phosphor on the periphery of the irradiation range (the scan spot) of the stimulating light are also stimulated as a result, causing the stimulable phosphor outside of the irradiation range of the stimulating light to emit stimulated emission, which is then detected as stimulated emission from within the irradiation range of the stimulating light, and the resolution of the image data of the latent image stored in the phosphor layer is deteriorated.

In order to avoid this phenomenon, a method is known wherein partition walls composed of a material impermeable to the stimulating light are disposed so as to partition the phosphor layer into a one- or two-dimensional fine grid along the plane of the panel, and the plurality of small compartments (hereinafter referred to as cells) formed by these partition walls are filled in with stimulable phosphor, forming columns or belts (as in for example, Japanese Unexamined Patent Publication No. 62(1986)-36600). In a phosphor layer having these cells arranged in the horizontal orientation thereof//spread across the plane thereof, the stimulating light is limited by the impermeable material of which the cell partition walls are formed and is not dispersed outside of a cell it enters, and the emission of stimulated emission outside of the irradiation range of the stimulating light can thereby be prevented. Therefore, the quantity of stimulated emission emitted from each cell corresponds to a value of one pixel of when the radiation image described above is to be reproduced, and when the image is read out from the phosphor layer, the radiation image reproduced has a high resolution, which is beneficial.

Note that aforementioned "material impermeable to stimulating light" is not limited to a material which cuts off the stimulating light completely, but refers to a material for which it is relatively difficult, compared to the stimulable phosphor packed within the cells, for the stimulating light to penetrate (preferably, substantially difficult for the stimulating light to penetrate).

However, although the cells forming the phosphor layer have a cyclical structure, the pitch of each cell is uneven. When stimulating light is irradiated onto the phosphor sheet having cells with an uneven construction, the quantity of stimulated emission from each cell corresponds to a value of one pixel when the radiation image described above is to be reproduced, and when the image is read out from the phosphor layer, aside from the change in the quantity of stimulated emission emitted in proportion to the quantity of radiation energy accumulated on the phosphor sheet, the quantity of stimulated emission changes depending on the unevenness of the pitch of the cells, and this causes a degradation in the image quality of the reproduced radiation image. For example, even if every region of the phosphor sheet is exposed to a strong beam of stimulating light of a uniform intensity, a fixed quantity of stimulated emission will not be emitted from each cell, and if a value of one pixel is assigned corresponding to the light emitted from each cell, a blurred image will be reproduced.

SUMMARY OF THE INVENTION

In view of the foregoing observations and description, the primary objective of the present invention is to provide a radiation image acquisition method and apparatus in which even if the pitch of the cells of the phosphor layer are uneven, the quantity of stimulated emission emitted from each cell can be acquired precisely as a digital image signal. The second objective of the present invention is to provide a cell interval detection method for aforementioned radiation image acquisition method and apparatus capable of precise detection of the interval between the multiple cells arranged in the phosphor layer.

In the radiation image acquisition method according to the present invention, the phosphor layer formed of a plurality of cells, arranged in at least the main scanning direction, filled with stimulable phosphor bearing thereon a radiation image is scanned in the main and a sub-scanning direction with a stimulating light beam and the stimulated emission emitted by the phosphor layer due to said scanning is photoelectrically detected as an analog image signal, and said analog image signal is digitized to obtain a digital image signal representing the radiation image; the signal component representing the cell partition walls included in the analog image signal is recognized, and the digital image signal is obtained from the component of the analog signal obtained between the recognized signal components of the cell partition walls.

Note that the expression "arranged in at least the main scanning direction" refers not to a matrix in which cells are lined up in the main and sub-scanning//vertical and horizontal directions, but to the long straight stripe-shaped cells disposed in the horizontal orientation.

In the radiation image acquisition method according to the present invention, a phosphor having light conversion characteristics different from the stimulable phosphor is mixed with either the cell partition walls or the stimulable phosphor contained therebetween, and the fluorescent light emitted from the phosphor material in the phosphor layer due to aforementioned scanning is detected and the signal component representing the partition walls included in the detected signal can be recognized in this way.

In addition, the signal component representing the partition walls included in the signal obtained by detecting the reflected stimulated light reflected by the phosphor layer due to aforementioned scanning can be recognized.

A mirror surface raising the reflective-index with respect to the stimulating light can be formed on the upper surface of the partition walls.

The cell partition walls can be tinted so that their reflective index with respect to the stimulating light is weakened.

The detected signal component representing the partition walls can be used as a trigger signal for digitizing the analog image signal to obtain the digitized image signal.

In the cell interval detection method of the present invention, the phosphor layer formed of a plurality of cells, arranged in at least the main scanning direction, filled with stimulable phosphor bearing thereon a radiation image is scanned in the main and a sub-scanning directions with a stimulating light and the stimulated emission emitted by the phosphor layer is photoelectrically detected as an analog image signal; the analog signal acquired thereby is then digitized to obtain a digital signal representing the radiation image. The signal component representing the partition walls included in the analog signal is recognized, and based on the thus recognized signal component representing the partition walls, the interval between cells can be obtained.

In the cell interval detection method of the present invention, a phosphor having light conversion characteristics different from the stimulable phosphor is mixed with either the cell partition walls or the stimulable phosphor contained therebetween and the fluorescent light emitted from the phosphor in the phosphor layer due to aforementioned scanning is detected; the signal component representing the partition walls included in the detected signal is recognized, and based on the thus recognized signal component representing the partition walls, the interval between cells can be obtained.

In addition, the signal component representing the partition walls included in the detected signal can be recognized by detecting the reflected stimulated light reflected by the phosphor layer when aforementioned scanning is performed, and based on the thus recognized signal component representing the partition walls, the interval between cells can be obtained.

The radiation image acquisition apparatus of the present invention comprises a phosphor layer formed of a plurality of cells, arranged in at least the main scanning direction, filled with stimulable phosphor bearing thereon a radiation image, a scanning apparatus that scans the phosphor layer in the main and a sub-scanning direction with a stimulating light beam, a detection means that photoelectrically detects as an analog image signal the stimulated emission from the phosphor layer caused by the scanning, a signal acquisition means that digitizes the analog image signal to obtain a digital image signal representing the radiation image; wherein, the detection means recognizes the signal component representing the partition walls included in the analog signal, and obtains the digital image signal from the component of the analog signal obtained between the recognized signal components representing the partition walls.

Either the cell partition walls or the stimulable phosphor contained therein is mixed with a phosphor having light conversion characteristics different from the stimulable phosphor, and the signal acquisition means recognizes the signal component representing the partition walls included in the signal obtained by detecting the fluorescent light emitted from the phosphor material in the phosphor layer due to aforementioned scanning.

The signal acquisition means can recognize the signal component representing the partition walls included in the signal obtained by detecting the reflected stimulating light reflected by the phosphor layer when aforementioned scanning is performed.

A mirror surface raising the reflective-index with respect to the stimulating light can be formed on the upper surface of the partition walls.

The cell partition walls can be tinted so that their reflective index with respect to the stimulating light is weakened.

The signal acquisition means can use the detected signal component representing the cell partition walls as a trigger signal for digitizing the analog image signal.

The digital image signal can also be corrected by being divided by the signal component representing the cell partition walls.

The cell-interval detection apparatus of the present invention comprises: a scanning means that scans in the main and a sub-scanning directions with a stimulating light beam the phosphor layer formed of a plurality of cells, arranged in at least a main scanning direction, filled with stimulable phosphor bearing thereon a radiation image; a detection means that photoelectrically detects as an analog image signal the stimulated emission from the phosphor layer due to the scanning; and a cell interval detection means that recognizes the signal component representing the partition walls included in the analog signal, and based on the thus recognized signal component of the partition walls, obtains the interval between cells.

Either the cell partition walls or the stimulable phosphor contained therein is mixed with a phosphor having light conversion characteristics different from the stimulable phosphor, and the cell interval detection means recognizes the signal component representing the partition walls included in the signal obtained by detecting the fluorescent light emitted from the phosphor material in the phosphor layer due to aforementioned scanning and can obtain the cell interval based on the recognized signal component of the partition walls.

The cell-interval detection apparatus recognizes the signal component representing the partition walls included in the signal obtained by detecting the reflected stimulated light reflected by the phosphor layer when aforementioned scanning is performed, and can obtain the cell interval based on the recognized signal component of the partition walls.

Note that the expression "a phosphor material having light conversion characteristics different from those of the stimulable phosphor" refers to a phosphor material that emits light of a wavelength range different from that of the wavelength emitted by the stimulable phosphor when irradiated by the stimulating light beam.

According to the radiation image acquisition method and apparatus of the present invention, the phosphor layer formed of a plurality of cells, arranged in at least the main scanning direction, filled with stimulable phosphor bearing thereon a radiation image is scanned in the main and a sub-scanning directions with a stimulating light beam, and the stimulated emission emitted by the phosphor layer due to the scanning is photoelectrically detected as an analog image signal. In digitizing this analog signal to obtain a digital signal representing the radiation image, the signal component representing the partition walls included in the analog signal is recognized, and because the digital image signal is to be obtained from the component of the analog signal obtained between the recognized signal components of the partition walls, the quantity of stimulated emissions from each cell and the detection value of the quantity of stimulated emissions from each cell can be made to correspond precisely and the analog signal digitized. In this way, the quantity of stimulated emissions within each cell can be obtained precisely as digital image signals.

Note that if a mirror surface that raises reflective-index, with respect to the stimulating light, is formed on the upper surface of the cell partition walls, or if the cell partition walls are subjected to tinting so as to weaken the reflective index thereof, because the difference in intensity of the stimulating light reflected form the cell partition walls and that reflected from the stimulable phosphor can be increased, the signal component representing the cell partition walls can be recognized more accurately.

In addition, if the digital image signal is obtained by using the recognized image signal component representing the cell partition walls as a trigger signal, the quantity of stimulated emissions from each cell and the detection value of the quantity of stimulated emissions from each cell can be made to correspond more precisely and the analog signal digitized, whereby the quantity of stimulated emissions within each cell can be more precisely obtained as digital image signals.

Further, if the value obtained by digitization is corrected by being divided by the signal component representing the cell partition walls, the quantity of stimulated emissions from each cell can be corrected according to the unit of stimulating light scanning distance (the unit length or area).

According to the cell interval detection method and apparatus of the present invention, by recognizing the signal component representing the partition walls included in the analog signal, because the cell interval is obtained based on the thus recognized signal component representing the partition walls, the interval between cell partition walls and the interval of the signal component included in aforementioned analog image signal can be made to correspond precisely and the interval between cells can be detected.

DESCRIPTION OF THE PREFERRED EMBODIMENTS

Figure 1:
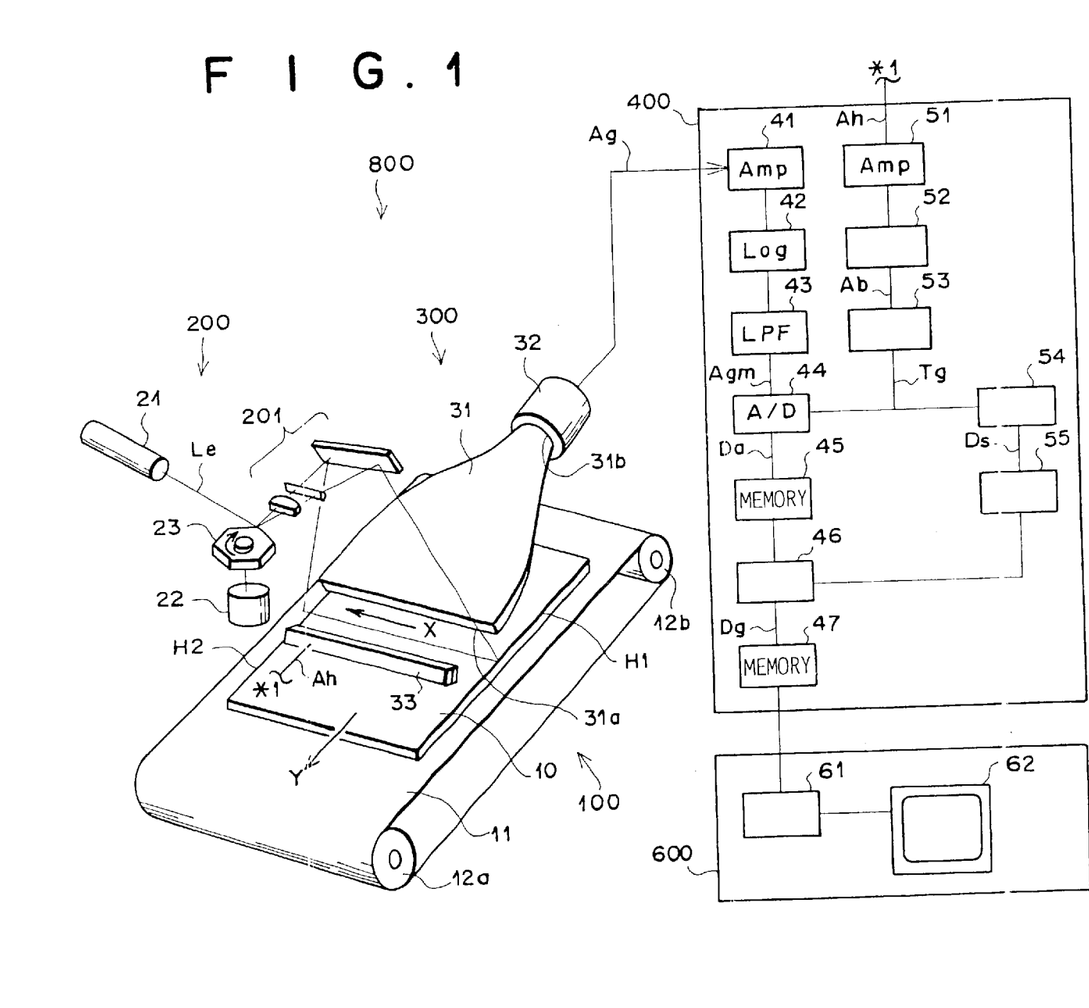
FIG. 1 shows an embodiment of the radiation image acquisition apparatus according to the present invention and the cell-interval detection apparatus included therein.

Hereinafter a preferred embodiment of the present invention will be explained with reference to the drawings. FIG. 1 is a schematic diagram of a radiation image acquisition apparatus implementing the radiation image acquisition method according to the present invention. A radiation image acquisition apparatus 800 according to the current embodiment comprises a conveyor unit 100 on which a radiation conversion panel 10 bearing there on a radiation image is placed and conveyed, a stimulating light projecting unit 200 which causes a stimulating light beam to scan the radiation image conversion panel 10 in the direction of said conveyance (the sub-scanning direction) and substantially perpendicular to the direction of conveyance (the main scanning direction) of the radiation image conversion panel 10 by the conveyor unit 100, a detector unit 300 which photoelectrically detects stimulated emission emitted from the radiation image conversion panel 10 upon exposure to the stimulating light beam, a signal acquisition unit 400 which processes the analog image signal photoelectrically detected by the detector unit 300 and obtains two-dimensional image data representing the radiation image recorded on the radiation image conversion panel 10.

The conveyor unit 100 comprises an endless belt 11 on which the radiation conversion panel is placed, and a pair of rollers 12a and 12b which support the end less belt 11. Roller 12a is rotated by a drive means (not shown) to run the endless belt 11 (and to move the radiation image conversion panel 10 thereon) in the direction of arrow Y (the sub-scanning direction) by 60 um per one main scanning (to be described later).

Figures 2A, 2B:
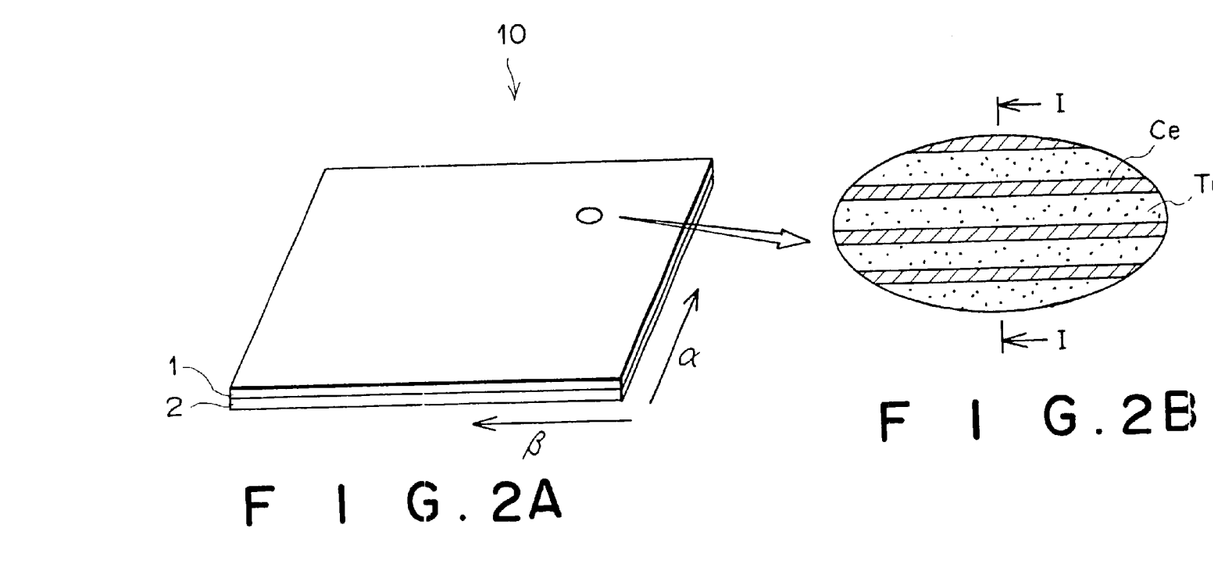
FIGS. 2A, 2B and 2C show detailed representation of the phosphor layer.
Figure 2C:
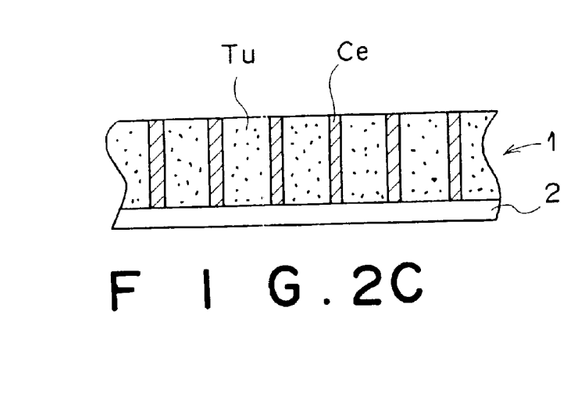

FIGS. 2A, 2B and 2C are schematic drawings of the radiation image conversion panel 10. FIG. 2A is a perspective view, FIG. 2B is an enlarged front perspective view and FIG. 2C is a cross-sectional view along line I—I of FIG. 2B of radiation conversion panel 10. The lengthwise radiation image conversion panel 10, as shown in FIG. 2A, is formed of a stimulable phosphor layer (hereinafter referred to as phosphor layer 1) which is supported on a sheet-type support panel 2. As shown in FIGS. 2B and 2C, the cell partition walls of phosphor layer 1 are arranged in the direction of arrow α (the sub-scanning direction) providing for a cell structure formed of stripes. The cells comprise cell partition walls formed of a comparatively hard material Ce, and the area between the cell partition walls is filled with stimulable phosphor (hereinafter referred to as stripe-shaped stimulable phosphor Tu) composed of a material (a softer than that of the cell partition walls. Cell partition wall Ce has a higher reflective index with respect to the stimulating light than does stripe-shaped stimulable phosphor Tu. Although the stripe-shaped stimulable phosphor emits stimulated emission Lk upon irradiation by a stimulating light beam, cell partition wall Ce does not, even if it is exposed to the stimulating light. Also, because cell partition wall Ce is formed of a material impermeable to the stimulating light, when phosphor layer 1 is irradiated by the stimulating light beam, it is very rare that said stimulating light radiates outside the stimulable phosphor Tu and the confines of cell partition wall Ce to invade an adjacent cell.

In addition, when radiation image conversion panel is placed on endless belt 11 of conveyor unit 100, the direction of arrow β in which the stripes of the cells extend is the conveyance direction of conveyor unit 100, that is, in the direction of arrow Y (the sub-scanning direction) shown in FIG. 1. A stimulating light beam Le is scanned in the direction of arrow α running crosswise with respect to the cell partition walls of radiation conversion panel 10, that is, distributed in the same direction of arrow X (the main scanning direction) shown in FIG. 1. Therefore, while stimulating light beam Le is being scanned repeatedly over radiation conversion panel 10 in the main scanning direction, by the conveying of radiation conversion panel 10 by conveyor unit 100 in the sub-scanning direction, radiation conversion panel 10 is scanned two-dimensionally by stimulating light beam Le.

Stimulating light projecting unit 200 comprises a stimulating light source 21 which emits a stimulating light beam Le, a rotary polygonal mirror 23 which is rotated by a motor 22 and deflects the stimulating light beam Le, and an optical system 201 made up of an fθ lens, a cylindrical lens, a mirror and the like which are arranged to converge the deflected stimulating light beam Le on the radiation image conversion panel 10. The stimulating light source 21 is caused to repeatedly scan the radiation image conversion panel 10 at a speed of 40/msec in a direction substantially perpendicular to the sub-scanning direction (the direction of arrow X) by polygonal mirror 23 and optical system 201.

Detector unit 300 comprises a light guide 31 which takes in the stimulated emission Lk (emitted from the radiation image conversion panel 10 upon exposure to the stimulating light beam Le) from its inlet end 31*a* and radiates the stimulated emission Lk through its outlet end 31*b*, photomultiplier 32 which photoelectrically detects the stimulating light beam Le guided by light guide 31, and line sensor group 33 which detects the reflected stimulating light reflected by radiation panel 10 upon irradiation thereupon of stimulating light Le.

Figure 3:
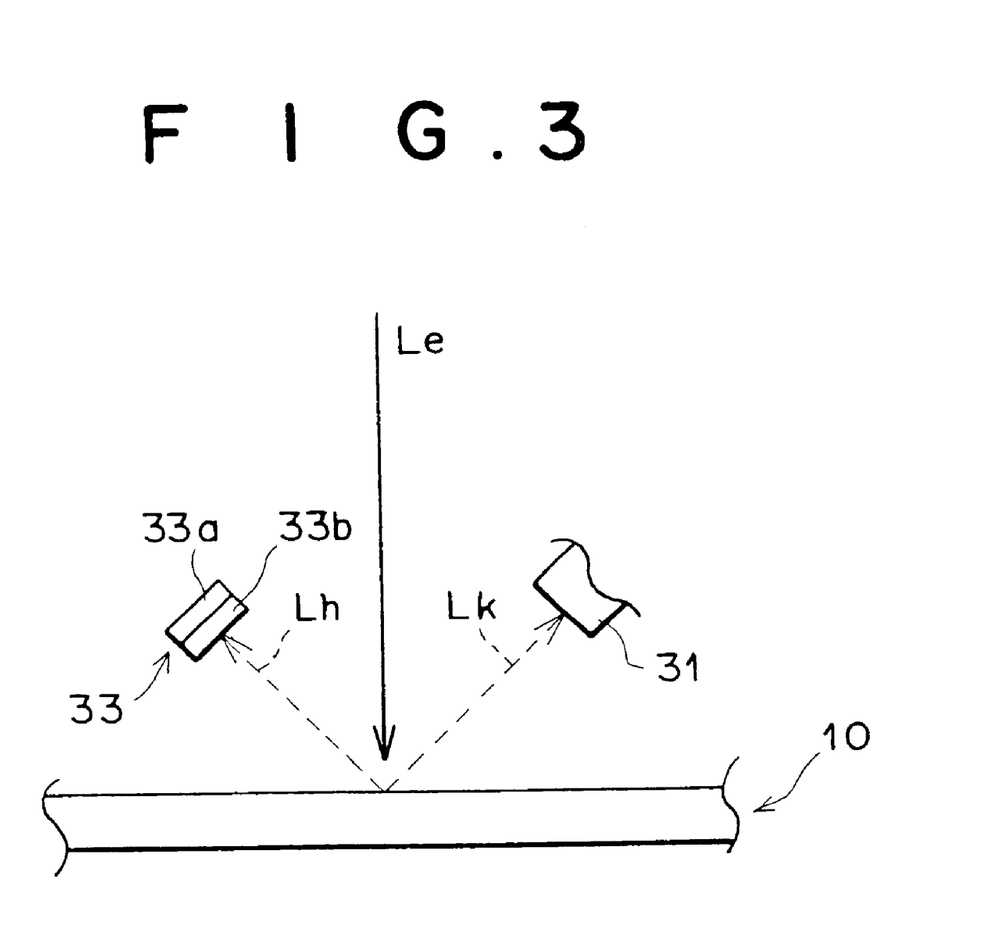
FIG. 3 shows a detailed representation of the detection unit.

A more detailed depiction is shown in FIG. 3, in which the stimulating light Le enters radiation conversion panel 10 at a substantially perpendicular direction thereto, and a portion of the stimulated emission Lk emitted by phosphor layer 1 exposed to stimulating light Le is radiated within light guide 31 and detected by photomultiplier 32, and a portion of the stimulating light Le reflected by irradiated phosphor layer 1 is detected by line sensor group 33. Light guide 31 is formed of a light transmitting material such as an acrylic plate. Inlet end 31*a* of light guide 31 is in the form of a linear opening and outlet end 31*b* is in the form of a circular opening. The linear inlet end 31*a* of the light guide 31 extends in the main scanning direction of radiation conversion panel 10 and the circular light outlet end 31*b* of the light guide 31 is connected to the light receiving face of photomultiplier 32. Installed between said light receiving face and outlet end 31*b* of light guide 31 is a stimulating light cutoff filter (not shown) that cuts off the stimulating light Le and only allows stimulated emissions Lk to pass through.

Stimulating light entering light guide 31 from input end 31*a* is repeatedly totally reflected within light guide 31 and radiated toward outlet end 31*b*, and when it enters the light receiving face it is photoelectrically converted and output as stimulable phosphor analog image signal Ag.

In addition, as shown in FIG. 3, line sensor group 33 is formed as an integral unit comprising line sensor 33*a* and a band filter 33*b*, which permits passage only of the wavelength range of light of stimulating light Le and cuts of stimulated emissions emitted from phosphor layer 1 upon irradiation thereon by stimulating light Le, and which detects only reflected stimulating light Lh reflected from phosphor layer 1, which is photoelectrically converted and output as an analog reflection signal Ah.

Signal acquisition unit 400 comprises a preamplifier 41 that amplifies the analog stimulable phosphor image signal output from detector unit 300, a log-amplifier that logarithmically converts the analog image signal amplified by preamplifier 41, and a low pass filter 43 that removes high frequency signals so as to prevent the occurrence of aliasing. The analog corrected image signal Agm that passes through low pass filter 43 is digitized by A/D converter 44, whereby a digital image signal Da is obtained and stored in image memory 45.

On the one hand, after analog reflected light signal Ah, which represents the intensity of reflected stimulating light signal Lh that was detected and output by line sensor group 33, is amplified by preamplifier 51, reflected stimulating light signal Lh is micro divided and rectified by micro division circuit 52, and signals representing places in which extreme changes in intensity have occurred are recognized. That is to say, the signals representing the cell partition walls are recognized, and output as analog micro-divided reflected light signal Ab. Analog micro-divided reflected light signal Ab output from micro division circuit 52 is input to a trigger signal generator 53, where analog micro-divided reflected light signal Ab is digitized and trigger signal Tr, which represents the sampling timing, is obtained thereby and input in A/D converter 44. Further, said trigger signal Tr is also output to sampling timing calculator 54, which obtains the sequence of the time interval between each trigger signal (the sampling time), and the value is stored in sampling time memory 55 as sampling time data Ds. Note that sampling time data Ds is obtained of the cell intervals as the time interval between scans of the cells with the stimulating light, and depending on the speed of the scanning, if scanning time data Ds is divided by the main scanning direction scanning speed of the stimulating light, the cell interval (cell pitch) can be represented as length.

Then, the values of digital image data Da stored in image memory 45 and sampling time data Ds stored in sampling time memory 55 are input to correcting calculator 46, and each value of digital image signal Da is divided by its corresponding sampling time value and the values obtained thereby are stored in corrected image memory 47.

Display init 600 comprises an image processing circuit 61 that inputs from corrected image memory the corrected image signal which is then converted to a visible image signal and output, and a display 62 that displays the visible image signal.

Next, the operation of each function of the embodiment described above will be explained in detail. First, the acquisition of analog stimulable phosphor image signal Ag and corrected image signal Agm will be explained. Radiation image conversion panel 10 is placed on conveyor unit 100 and conveyed in the sub-scanning direction (direction Y) and scanned by scanned in the main scanning direction (direction X) by stimulating light projector unit 200, and the stimulable phosphor of phosphor layer 1 is exposed to stimulating light, whereby stimulated emission Lk is produced consecutively along the main scanning line.

Figure 4A:
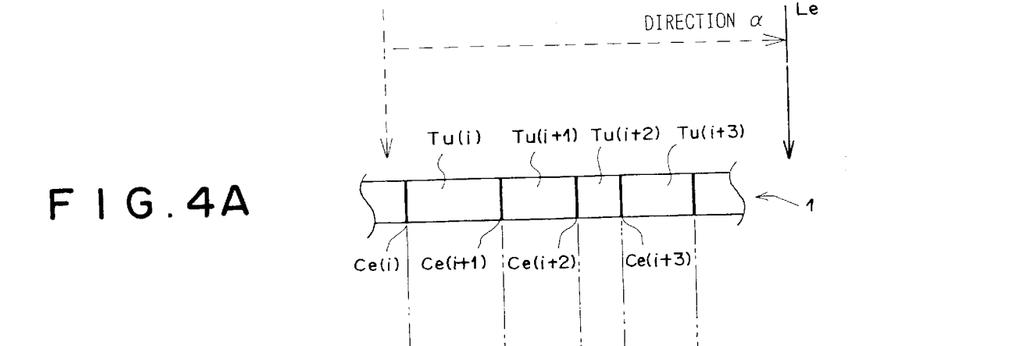
FIGS. 4A, 4B and 4C show the correspondence between the structure of the phosphor layer and the signal obtained thereof.

More specifically, as shown in FIG. 4A, phosphor layer one has stripe-shaped stimulable phosphor Tu(i), Tu(i+1), Tu(i+2), Tu(i+3), etc. and cell partition walls Ce(i), Ce(i+1), Ce(i+2), Ce(i+3) etc. arranged thereon alternately, and the pitch of the cells is uneven. Analog stimulable phosphor image signal Ag detected by detector unit 300 is composed of alternately appearing signals STu obtained when stripe-shaped stimulable phosphor Tu is scanned with stimulating light Le and stimulated light Lk produced thereby is detected by detector unit 300 and signals Sce, which are weaker in intensity, that represent the cell partition walls, obtained when the cell partition walls are scanned with stimulating light Le and detected by detector unit 300.

Figures 4B, 4C:
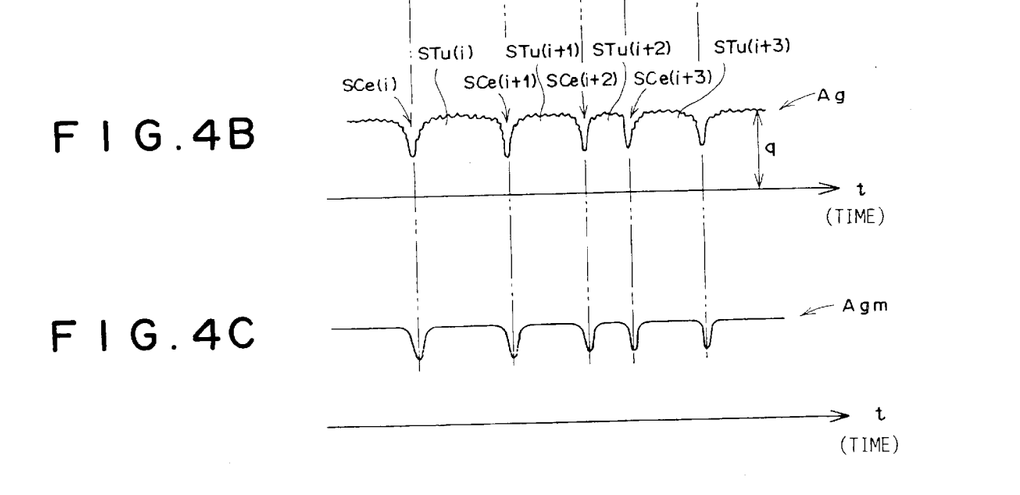

In analog stimulable phosphor image signal Ag, for cases in which the intensity of the exposed radiation image recorded on phosphor layer 1 is fixed for all regions thereon, as shown in FIG. 4, values STu(i), STu(i+1), STu(i+2), STu(i+3), etc. obtained when stripe-shaped stimulable phosphor Tu(i), Tu(i+1), Tu(i+2), Tu(i+3), etc. are scanned are the same value q.

As shown in FIG. 4C, analog stimulable phosphor image signal Ag is passed through preamplifier 41, logarithmical amplifier 42 and low pass filter 43 and is output as corrected analog image signal Agm, in which are stored the basic waveforms representing the scans of stripe-shaped stimulable phosphor Tu and cell partition walls Ce.

Figure 5A:
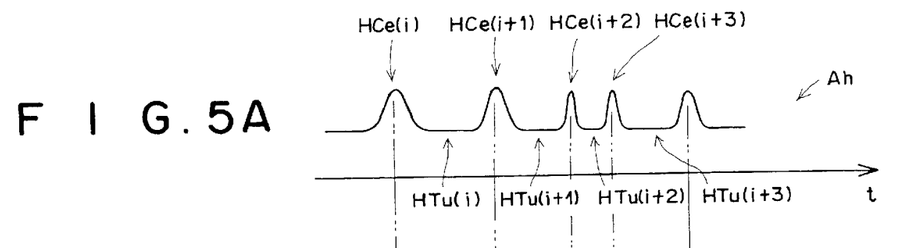
FIGS. 5A, 5B and 5C show the correspondence between the analog reflection signal and the micro dividing of said signal to obtain the trigger signal.
Figure 5B:
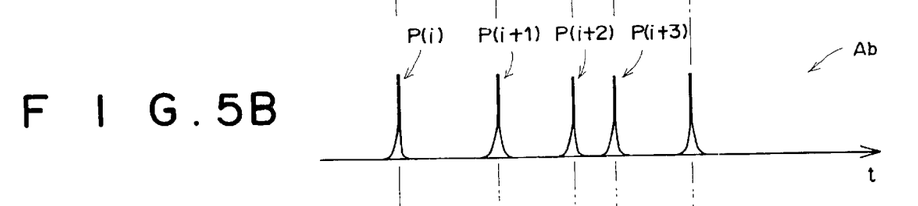

Next, the acquisition of trigger signal Tg from analog reflected light signal Ah detected by detector unit 300 will be explained. By scanning sequentially the cell partition walls Ce and the stripe-shaped stimulable phosphor Tu contained with the cells, which have different reflective indexes, reflected stimulating light h is received by line sensor group 33, and as shown in FIG. 5A, reflected stimulated light signal Ah, in which appear alternately the high intensity HCe(i), HCe(i+1), HCe(i+2), HCe(i+3) etc. detected when cell partition walls Ce(i), Ce(i+1), Ce(i+2), Ce(i+3) etc. are scanned by stimulating light and HTu(i), HTu(i+1), HTu(i+2), HTu(i+3), etc. detected when stripe-shaped stimulable phosphor Tu(i), Tu(i+1), Tu(i+2), Tu(i+3), etc. are scanned by stimulating light, is detected. Then, as shown in FIG. 5B, reflected stimulated light signal Ah is input from preamplifier 51 to micro division circuit 52, micro divided and rectified and as shown in FIG. 5C, analog micro divided reflected light signal Ab, comprising pulse type signals P(i), P(i+1), P(i+2), P(i+3), etc. in which the cell interval can be recognized, is formed.

Figure 5C:
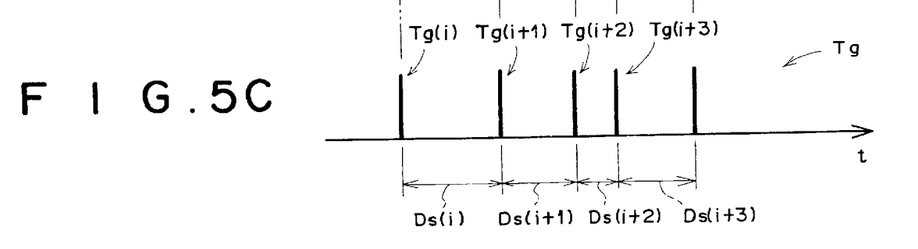

As in the sampling timing shown in FIG. 5C, when analog micro divided reflected light signal Ab is input to trigger signal generator 53, and converted by A/D converter 44, trigger signals Tg(i), Tg(i+1), Tg(i+2), Tg(i+3), etc. are formed.

Next, the obtaining of sampling time data Ds from trigger signal Tg will be explained. As described above, accompanying the output of trigger signal Tg from trigger signal generator 53 to A/D converter 44, trigger signal Tg is also output to sampling time calculator 54 and as shown in FIG. 5C, sampling time calculator 54, to which trigger signal Tg has been input, obtains from adjacent trigger signals Tg(i)–Tg(i+1), Tg(i+2)–Tg(i+3), etc. sampling time data Ds(i), Ds(i+1), Ds(i+2), Ds(i+3), etc., and these values are then stored in sampling time memory 55. As described above, sampling time data Ds is obtained from the cell interval (cell pitch) as the cell scanning time interval of the stimulating light, and precisely represents the time interval of the scanning of the interval of the cells arranged in phosphor layer 1. Further, if sampling time data Ds is divided by the speed of the scanning of the stimulating light in the main scanning direction (40 m/sec) the cell interval (cell pitch) can be represented as length.

Figure 6A:
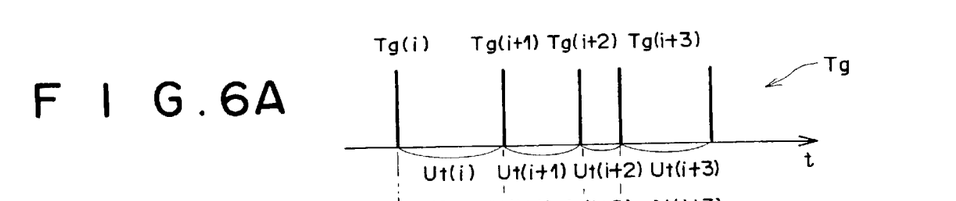
FIGS. 6A, 6B and 6C show the correspondence between the analog stimulable phosphor image signal and the two-dimensional image data obtained thereof.

Next, the obtaining of digital image signal Da by digitizing analog corrected image signal Agm will be explained. Analog corrected image signal Agm output from low pass filter 43 and trigger signal Tg output from trigger signal generator 53 are input to A/D converter 44, and as shown in FIG. 6A, analog corrected image signal Agm is digitized employing trigger signals Tg(i), Tg(i+1), Tg(i+2), Tg(i+3), etc., which represent the scans of cell partition walls, as signals indicating the start and finish of sampling. That is to say, analog corrected image signal Agm obtained of the signal component between the signal components representing cell partition walls is precisely obtained as a digital value, and even if the cells arranged on phosphor layer 1 on which a radiation image has been recorded are uneven in pitch, the quantity of stimulated emission emitted from the stimulable phosphor within each cell can be accurately obtained as a digital image signal.

Figure 6B:
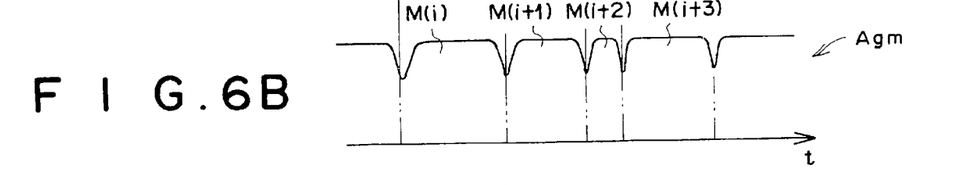

In other words, as shown in FIGS. 6A and 6B, because the signal representing cell partition walls contained in trigger signal Tg and analog corrected image signal Agm are synchronous, by digitizing analog corrected image signal Agm by employing adjacent trigger signals as sampling start and finish signals, the signal component included in analog corrected image signal Agm representing the quantity of stimulated emission emitted from the stimulable phosphor contained within each cell can be detected for each cell.

Figure 6C:
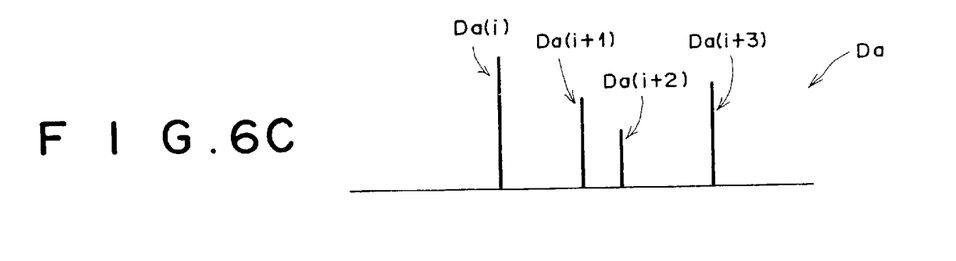
Figure 7:
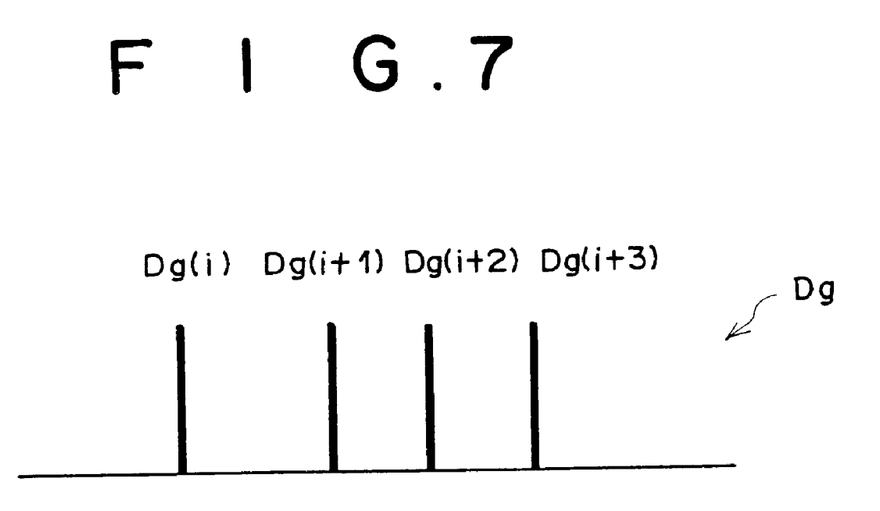
FIG. 7 shows the digital image signal obtained by the signal acquisition unit.

More specifically, in the sampling times Ut(i), Ut(i+1), Ut(i+2), Ut(i+3), etc. between adjacent trigger signals Tg, analog corrected image signal Agm shown in FIG. 6B is subjected to the integration processing for digitizing an analog signal, and values area M(i), M(i+1), M(i+2), M(i+3), etc. correspond to the quantity of stimulated emission emitted by the stimulated phosphor contained within each cell, that is, digital signal values such as those shown in FIG. 6C, Da(i), Da(i+1), Da(i+2), Da(i+3), etc. are stored in image memory 45.

Here, the values held by analog corrected image signal Agm of the signals representing the radiation image were all of a fixed value q, but because the digital image signal values, Da(i), Da(i+1), Da(i+2), Da(i+3), etc. obtained by digitizing analog corrected image signal Agm are values precisely detected of the quantity of stimulated emission emitted by the stimulated phosphor contained within each cell, which have inconsistencies in cell intervals, as shown in FIG. 6C, corresponding to the cell interval, each will have a different value.

Note that the above described sampling times Ut(i), Ut(i+1), Ut(i+2), Ut(i+3), etc. and sampling time data Ds(i), Ds(i+1), Ds(i+2), Ds(i+3), etc. stored in the sampling time memory each have the same value for each corresponding cell.

Next, correcting digital image signal Da by employing sampling time data Ds will be explained. As explained above, even if the radiation which phosphor layer 1 has been exposed to is of a uniform consistency, because the pitch of the cells is uneven, the detected quantity of stimulated emission emitted by the stimulated phosphor contained within each cell will differ in value, and the values correspond to the integration value of the analog corrected image signal Agm in each sampling time Ut(i), Ut(i+1), Ut(i+2), Ut(i+3), etc., that is, area M(i), M(i+1), M(i+2), M(i+3), etc. in FIG. 6. Digital image signal Da, by being divided by the scanning time of stimulating light between cell partition walls use by use of correcting calculator 46, is corrected into digital data image data Dg representing the quantity of stimulated emission emitted by the stimulated phosphor contained within each cell per unit of stimulating light scanning distance (the unit length or area).

Digital image data Dg stored in corrected image memory 47 is output to display unit 600, and through visual image signal processing circuit 61 is displayed on display 62.

In addition, in the current embodiment described above, in order to increase the difference in the respective reflective indexes of the cell partition walls and the stripe-shaped stimulable phosphor, the upper surface of cell partition wall Ce shown by FIGS. 2B and 2C can be processed so that a mirror surface is formed thereon, or conversely, cell partition wall Ce can be tinted a color that absorbs the stimulating light.

Further, a phosphor emitting fluorescent light of a different range of wavelengths than that of the stimulated emission emitted by the stimulable phosphor when irradiated with stimulating light can be mixed with either the cell partition wall Ce shown in FIGS. 2B and 2C or with stimulable phosphor Tu, and band filter 33b changed to a filter that permits passage only of said fluorescent light emitted from the phosphor. By inputting the analog fluorescent light signal obtained by detecting the fluorescent light emitted by the phosphor upon irradiation by stimulating light to preamplifier 51 instead of aforementioned reflected light signal Ah, the same effects can be obtained by the same operations as in the embodiment described above.

Figure 8:
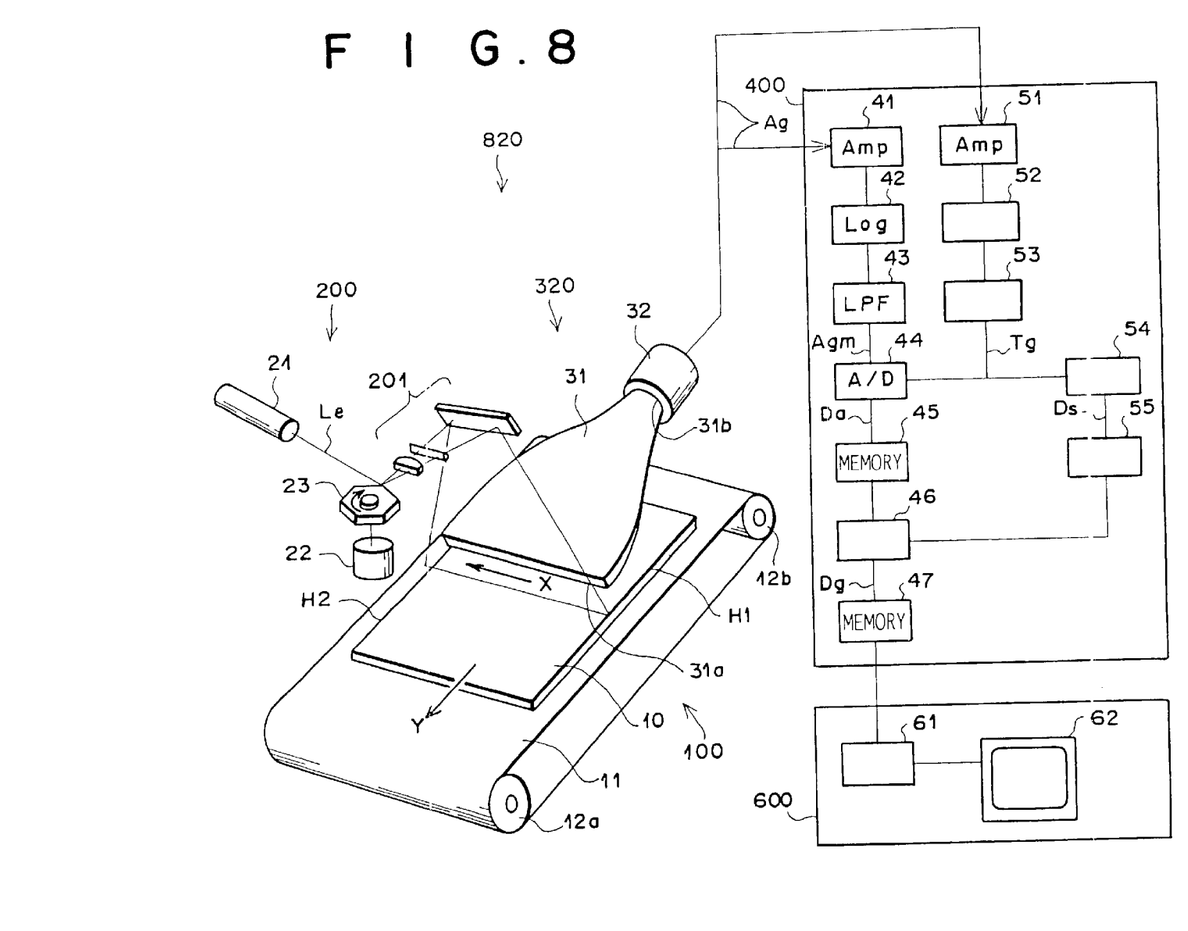
FIG. 8 shows a second embodiment of the radiation image acquisition apparatus according to the present invention and the cell-interval detection apparatus included therein.

Next, a second preferred embodiment of the present invention will be explained. FIG. 8 is a schematic diagram of a second embodiment of the radiation image acquisition apparatus implementing the radiation image acquisition method according to the present invention. Components thereof shared in common with the first embodiment are likewise labeled in FIG. 8.

Radiation image acquisition apparatus 820 according to the current embodiment comprises: in common with the first embodiment, radiation image conversion panel 10, conveyor unit 100, and stimulating light projector unit 200; a detection unit 320 from which line sensor group 33 of detection unit 300 of the first embodiment has been excluded; signal acquisition unit 400 in common with the first embodiment, wherein preamplifier 51, which was connected in the first embodiment to the output of line sensor 33, is connected to the input line of photomultiplier 32 of detector unit 320. In addition, display unit 600 is also shared in common with the first embodiment.

In the above described configuration, in place of the analog reflection signal Ah employed in the first embodiment, by inputting analog stimulable phosphor image signal Ag, which is a signal that represents the cell partition walls in the same way as analog reflected light signal Ah and is obtained by detecting the stimulated emission, to preamplifier 51, the same effects can be obtained for the same operations as in the first embodiment.

Figure 9:
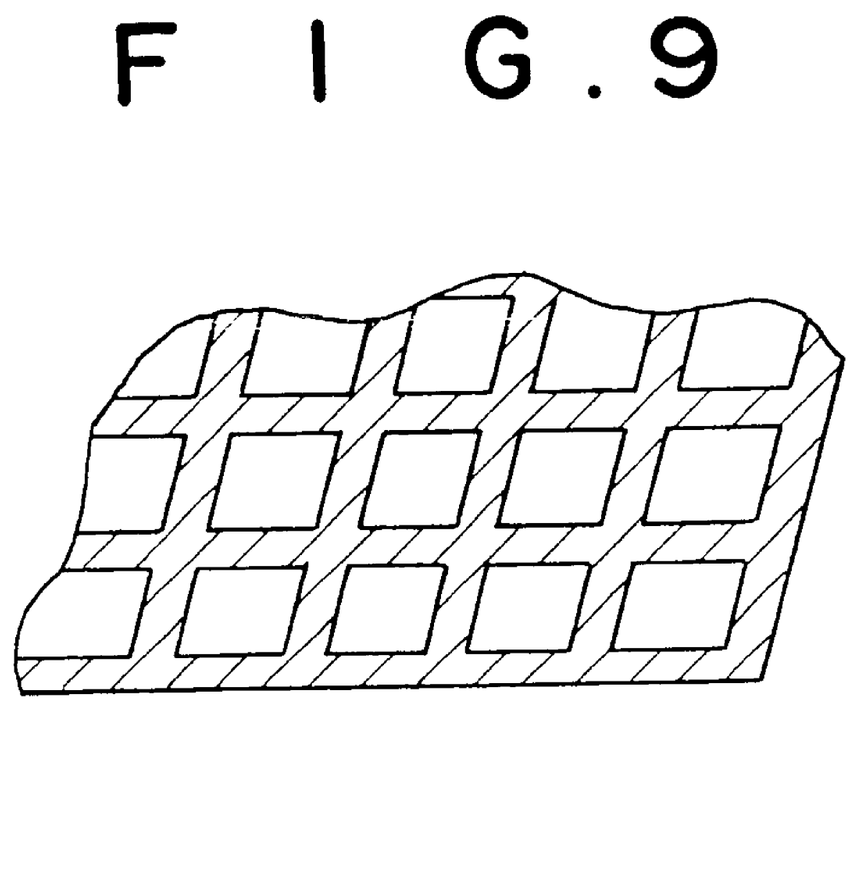
FIG. 9 shows a phosphor layer having a grid of partition walls.

Note that the cells arranged in the phosphor layer are not limited to being in a stripe form, as shown in FIG. 9, the cells may also be arranged in a grid in the main and the sub-scanning directions.

What is claimed is:

1. A method of obtaining a radiation image, comprising the steps of scanning a phosphor layer formed of a plurality of cells, each of said cells bounded by a plurality of partition walls, said plurality of cells arranged in at least a main scanning direction, filled with stimulable phosphor and bearing thereon a radiation image in said main and a sub-scanning directions with a stimulating light, photoelectrically detecting as an analog image signal the stimulated emission emitted by the phosphor layer due to said scanning, and digitizing said analog image signal to obtain a digital image signal representing the radiation image, wherein a signal component representing one of a plurality of partition walls of said cells included in the analog image signal is recognized, and the digital image signal is obtained from the component of the analog signal obtained between said recognized signal components representing the partition walls.

2. A method of obtaining a radiation image according to claim 1, further comprising the steps of mixing a phosphor having light conversion characteristics different from the stimulable phosphor with either the cell partition walls or the stimulable phosphor contained there between prior to scanning the phosphor layer; and detecting a fluorescent light emitted from the phosphor in the phosphor layer due to said scanning, and recognizing the signal component representing the partition walls included in the signal of the detected fluorescent light.

3. A radiation image acquisition method according to claim 1 or 2, wherein the digital image signal is corrected by being divided by the signal component representing the cell partition walls, wherein said signal component is a sampling time.

4. A method of obtaining a radiation image according to claim 1, further comprising the steps of detecting a reflected stimulating light reflected by the phosphor layer due to said scanning, and recognizing the signal component representing the partition walls included in the signal obtained by detecting said reflected stimulating light.

5. A radiation image acquisition method according to claim 4, wherein the cell partition walls are tinted so that the reflective index thereof to be weakened, with respect to the stimulating light.

6. A radiation image acquisition method according to claim 5 wherein the digital image signal is corrected by being divided by the signal component representing the cell partition walls, wherein said signal component is a sampling time.

7. A radiation image acquisition method according to claim 4, wherein the digital image signal is corrected by being divided by the signal component representing the cell partition walls, wherein said signal component is a sampling time.

8. A radiation image acquisition method according to claim 1, wherein a mirror surface that raises the reflective-index of the cell partition walls, with respect to the stimulating light, is formed on the upper surface of said cell partition walls.

9. A radiation image acquisition method according to claim 8, wherein the digital image signal is corrected by being divided by the signal component representing the cell partition walls, wherein said signal component is a sampling time.

10. A radiation image acquisition method according to claim 1, wherein the cell partition walls are tinted so that the reflective index of said cell partition walls is decreased with respect to the stimulating light.

11. A radiation image acquisition method according to claim 10, wherein the digital image signal is corrected by being divided by the signal component representing the cell partition walls, wherein said signal component is a sampling time.

12. A method of obtaining a radiation image, comprising:
scanning a phosphor layer formed of a plurality of cells, each of said cells bounded by a plurality of partition walls, said plurality of cells arranged in at least a main scanning direction, filled with stimulable phosphor and bearing thereon a radiation image in said main and a sub-scanning directions with a stimulating light;
photoelectrically detecting as an analog image signal the stimulated emission emitted by the phosphor layer due to said scanning; and
digitizing said analog image signal to obtain a digital image signal representing the radiation image, wherein a signal component representing one of a plurality of partition walls of said cells included in the analog image signal is recognized, and the digital image signal is obtained from the component of the analog signal obtained between said recognized signal components representing the partition walls, and
wherein the detected signal component representing the partition walls is used as a trigger signal in digitizing the analog image signal to obtain the digital image signal.

13. A method of obtaining a radiation image, comprising:
forming on the upper surface of a plurality of cell partition walls that bound a plurality of cells in a phosphor layer a mirror surface that raises the reflective-index of the cell partition walls with respect to the stimulating light;
scanning said phosphor layer, said phosphor layer formed of said a plurality of cells, said plurality of cells arranged in at least a main scanning direction, filled with stimulable phosphor and bearing thereon a radiation image in said main and a sub-scanning directions with a stimulating light;
photoelectrically detecting as an analog image signal the stimulated emission emitted by the phosphor layer due to said scanning;
digitizing said analog image signal to obtain a digital image signal representing the radiation image, wherein a signal component representing one of a plurality of partition walls of said cells included in the analog image signal is recognized, and the digital image signal is obtained from the component of the analog signal obtained between said recognized signal components representing the partition walls,
wherein the detected signal component representing the partition walls is used as a trigger signal in digitizing the analog image signal to obtain the digital image signal.

14. A method of detecting the interval between cells comprising scanning a phosphor layer formed of a plurality of cells, each cell bounded by a plurality of partition walls, said plurality of cells arranged in at least a main scanning direction, filled with stimulable phosphor and bearing thereon a radiation image in said main and a sub-scanning directions with a stimulating light, photoelectrically detecting as an analog image signal a stimulated emission emitted by the phosphor layer due to said scanning, and digitizing said analog image signal to obtain a digital image signal representing the radiation image, wherein a signal component representing the partition walls included in the analog signal is recognized, and based on said recognized signal component representing the partition walls, the space interval between cells is obtained.

15. A method of detecting the interval between cells as defined in claim 14 further comprising the steps of mixing a phosphor having light conversion characteristics different from the stimulable phosphor with either the cell partition walls or the stimulable phosphor contained therebetween, detecting fluorescent light emitted from the phosphor material in the phosphor layer due to aforementioned scanning, recognizing the signal component representing the partition walls included in the signal of the detected fluorescent light, and based on said recognized signal component representing the partition walls, obtaining the interval between cells.

16. A method of detecting the interval between cells as defined in claim 15, wherein the recognized signal component representing the partition walls is used as a trigger signal in digitizing the analog image signal to obtain the digital image signal.

17. A method of detecting the interval between cells as defined in claim 14 further comprising the steps of detecting the reflected stimulated light reflected by the phosphor layer due to said scanning, recognizing the signal component representing the partition walls included in the signal obtained by detecting said reflected stimulating light, and based on said recognized signal component representing the partition walls, obtaining the interval between cells.

18. A radiation image acquisition apparatus comprising a phosphor layer formed of a plurality of cells, each cell bounded by a plurality of partition walls, said plurality of cells arranged in at least a main scanning direction, filled with stimulable phosphor and bearing thereon a radiation image, a scanning apparatus that scans the phosphor layer in the main and a sub-scanning directions with a stimulating light, a detection means that photoelectrically detects as an analog image signal a stimulated emission from the phosphor layer caused by the scanning, a signal acquisition means that digitizes the analog image signal to obtain a digital image signal representing the radiation image; wherein the detection means recognizes a signal component representing the partition walls included in the analog signal, and obtains the digital image signal from the component of the analog signal obtained between the recognized signal components representing the partition walls.

19. A radiation image acquisition apparatus according to claim 18, wherein a phosphor having light conversion characteristics different from the stimulable phosphor is mixed with either the cell partition walls or the stimulable phosphor contained therebetween before the phosphor layer is formed and the signal acquisition means recognizes the signal component representing the partition walls included in the signal obtained by detection of the fluorescent light emitted from the phosphor material in the phosphor layer due to aforementioned scanning.

20. A radiation image acquisition apparatus according to claim 19, wherein the detected signal component representing the partition walls is used as a trigger signal in digitizing the analog image signal to obtain the digital image signal.

21. A radiation image acquisition apparatus according to claim 19, wherein the digital image signal is corrected by being divided by the signal component representing the cell partition walls, wherein said signal component is a sampling time.

22. A radiation image acquisition apparatus according to claim 18, wherein said signal acquisition means recognizes the signal component representing the partition walls included in the signal obtained by detecting the reflected stimulating light reflected by the phosphor layer when said scanning is performed.

23. A radiation image acquisition apparatus according to claim 22, wherein a mirror surface that raises the reflective-index of the cell partition walls with respect to the stimulating light is formed on the upper surface thereof.

24. A radiation image acquisition apparatus according to claim 23, wherein the detected signal component representing the partition walls is used as a trigger signal in digitizing the analog image signal to obtain the digital image signal.

25. A radiation image acquisition apparatus according to claim 23, wherein the digital image signal is corrected by being divided by the signal component representing the cell partition walls, wherein said signal component is a sampling time.

26. A radiation image acquisition apparatus according to claim 22, wherein the cell partition walls are tinted so that the reflective index thereof to be weakened with respect to the stimulating light.

27. A radiation image acquisition apparatus according to claim 22, wherein the detecting signal component representing the partition walls is used as a trigger signal in digitizing the analog image signal to obtain the digital image signal.

28. A radiation image acquisition apparatus according to claim 22, wherein the digital image signal is corrected by being divided by the signal component representing the cell partition walls, wherein said signal component is a sampling time.

29. A radiation image acquisition apparatus according to claim 18, wherein a mirror surface that raises the reflective-index of the cell partition walls with respect to the stimulating light is formed on the upper surface thereof.

30. A radiation image acquisition apparatus according to claim 29, wherein the detected signal component representing the partition walls is used as a trigger signal in digitizing the analog image signal to obtain the digital image signal.

31. A radiation image acquisition apparatus according to claim 29, wherein the digital image signal is corrected by being divided by the signal component representing the cell partition walls, wherein said signal component is a sampling time.

32. A radiation image acquisition apparatus according to claim 18, wherein the cell partition walls are tinted so that the reflective index thereof to be weakened with respect to the stimulating light.

33. A radiation image acquisition apparatus according to claim 32, wherein the detected signal component representing the partition walls is used as a trigger signal in digitizing the analog image signal to obtain the digital image signal.

34. A radiation image acquisition apparatus according to claim 32, wherein the digital image signal is corrected by being divided by the signal component representing the cell partition walls, wherein said signal component is a sampling time.

35. A radiation image acquisition apparatus according to claim 18, wherein the digital image signal is corrected by being divided by the signal component representing the cell partition walls, wherein said signal component is a sampling time.

36. A radiation image acquisition apparatus comprising:
a phosphor layer formed of a plurality of cells, each cell bounded by a plurality of partition walls, said plurality of cells arranged in at least a main scanning direction, filled with stimulable phosphor and bearing thereon a radiation image;
a scanning apparatus that scans the phosphor layer in the main and a sub-scanning directions with a stimulating light;
a detection means that photoelectrically detects as an analog image signal a stimulated emission from the phosphor layer caused by the scanning; and
a signal acquisition means that digitizes the analog image signal to obtain a digital image signal representing the radiation image,
wherein the detection means recognizes a signal component representing the partition walls included in the analog signal, and obtains the digital image signal from the component of the analog signal obtained between the recognized signal components representing the partition walls, and
wherein the detected signal component representing the partition walls is used as a trigger signal in digitizing the analog image signal to obtain the digital image signal.

37. A radiation image acquisition apparatus according to claim 36, wherein the digital image signal is corrected by being divided by the signal component representing the cell partition walls, wherein said signal component is a sampling time.

38. A cell interval detection apparatus comprising:
a scanning means that scans in a main and a sub-scanning directions with a stimulating light a phosphor layer formed of a plurality of cells, each of said cells bounded by a plurality of partition walls, said plurality of cells arranged in at least the main scanning direction, filled with stimulable phosphor and bearing thereon a radiation image; a detection means that photoelectrically detects as an analog image signal the stimulated emission from the phosphor layer due to the scanning; and a cell interval detection means that recognizes the signal component representing the partition walls included in the analog signal, and based on the thus recognized signal component of the partition walls, obtains the space interval between cells.

39. A cell interval detection apparatus according to claim 38, wherein a phosphor having light conversion characteristics different from the stimulable phosphor is mixed with either the cell partition walls or the stimulable phosphor contained there between and the cell interval detection means recognizes the signal component representing the partition walls included in the signal obtained by detecting the fluorescent light emitted from the phosphor material in the phosphor layer due to aforementioned scanning, and obtains the interval between cells, based on said recognized signal component representing the partition walls.

40. A cell interval detection apparatus according to claim 38, wherein said cell interval detection means recognizes the signal component representing the partition walls included in the signal obtained by detecting the reflected stimulating light reflected by the phosphor layer when said scanning is performed, and based on said recognized signal component representing the partition walls, the interval between cells is obtained.

41. A method of obtaining a radiation image, comprising:
scanning a phosphor layer formed of a plurality of cells, each of said cells bounded by a plurality of partition walls, said plurality of cells arranged in at least a main scanning direction, filled with stimulable phosphor and bearing thereon a radiation image in said main and a sub-scanning directions with a stimulating light;
photoelectrically detecting as an analog image signal the stimulated emission emitted by the phosphor layer due to said scanning;
digitizing said analog image signal to obtain a digital image signal representing the radiation image, wherein a signal component representing one of a plurality of partition walls of said cells included in the analog image signal is recognized, and the digital image signal is obtained from the component of the analog signal obtained between said recognized signal components representing the partition walls;

mixing a phosphor having light conversion characteristics different from the stimulable phosphor with either the cell partition walls or the stimulable phosphor contained therebetween prior to scanning the phosphor layer;

detecting a fluorescent light emitted from the phosphor in the phosphor layer due to said scanning; and recognizing the signal component representing the partition walls included in the signal of the detected fluorescent light.

* * * * *